No. 726,858. PATENTED MAY 5, 1903.
A. H. CANNING.
AUTOMATIC WEIGHING MACHINE.
APPLICATION FILED JULY 7, 1902.
NO MODEL. 6 SHEETS—SHEET 5.

Witnesses
A. H. Canning, Inventor
by
Attorneys

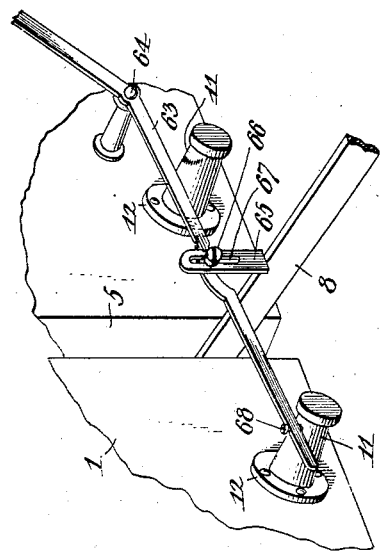

No. 726,858. Patented May 5, 1903.

UNITED STATES PATENT OFFICE.

ALEXANDER HASTINGS CANNING, OF TORONTO, CANADA.

AUTOMATIC WEIGHING-MACHINE.

SPECIFICATION forming part of Letters Patent No. 726,858, dated May 5, 1903.

Application filed July 7, 1902. Serial No. 114,634. (No model.)

*To all whom it may concern:*

Be it known that I, ALEXANDER HASTINGS CANNING, a subject of the King of England, residing at Toronto, in the Province of Ontario and Dominion of Canada, have invented a new and useful Automatic Weighing-Machine, of which the following is a specification.

This invention relates to automatic weighing-machines in which the material to be weighed is fed by spiral conveyers through spouts into a receiving vessel supported by a scale-beam and in which the feeding mechanism is temporarily inactive when the desired quantity of material has been fed while the contents of the receiver is being discharged or while an empty receiving vessel is being substituted for the filled one, as the case may be.

My invention consists in certain improvements in the construction and arrangement of the parts of the device, whereby the latter as a whole shall be rendered simple in construction and efficient in operation.

The means whereby the objects of my invention are attained will be hereinafter fully described and particularly pointed out in the claims.

Figure 1:
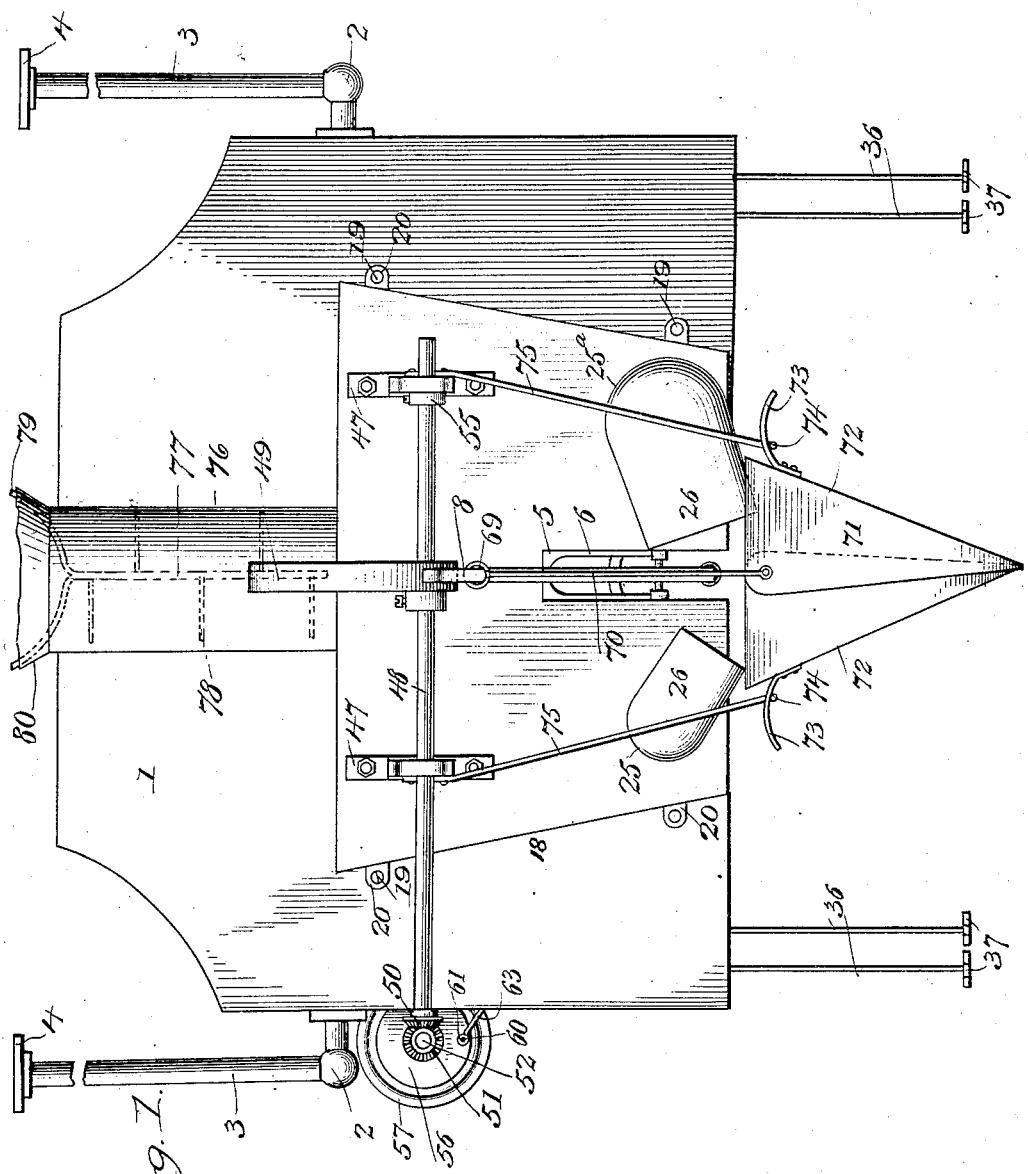
Figure 2:
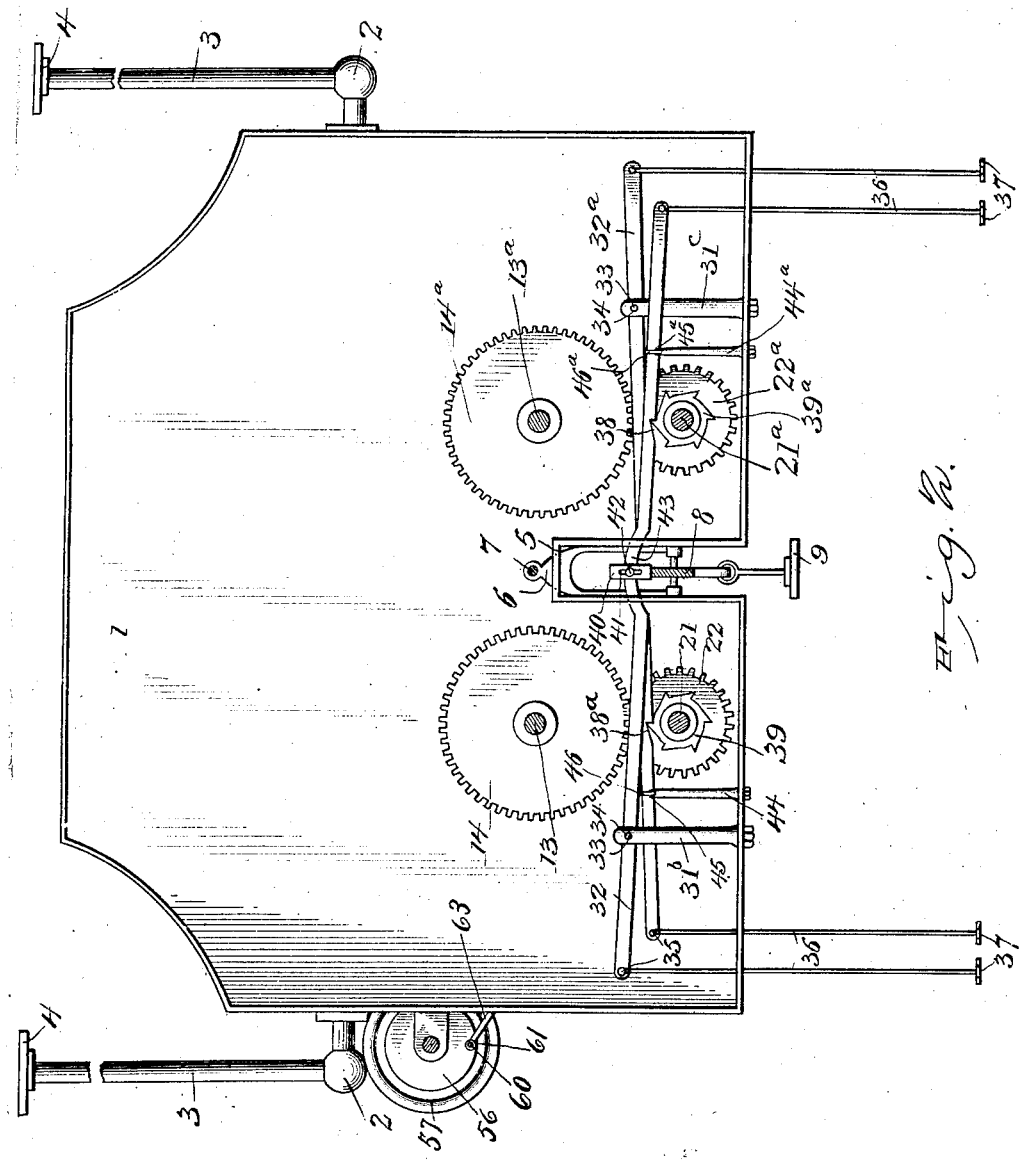
Figure 3:
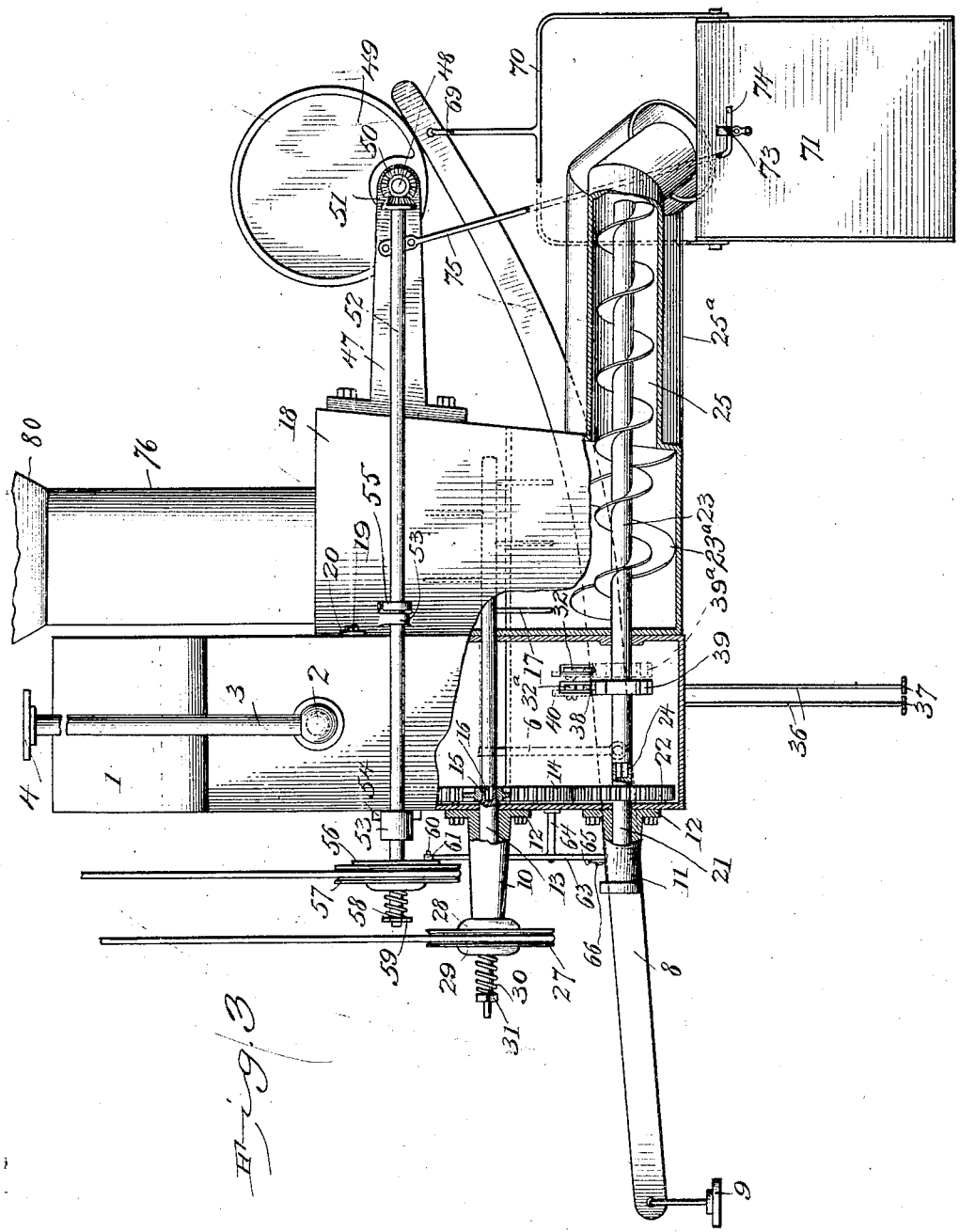
Figure 4:
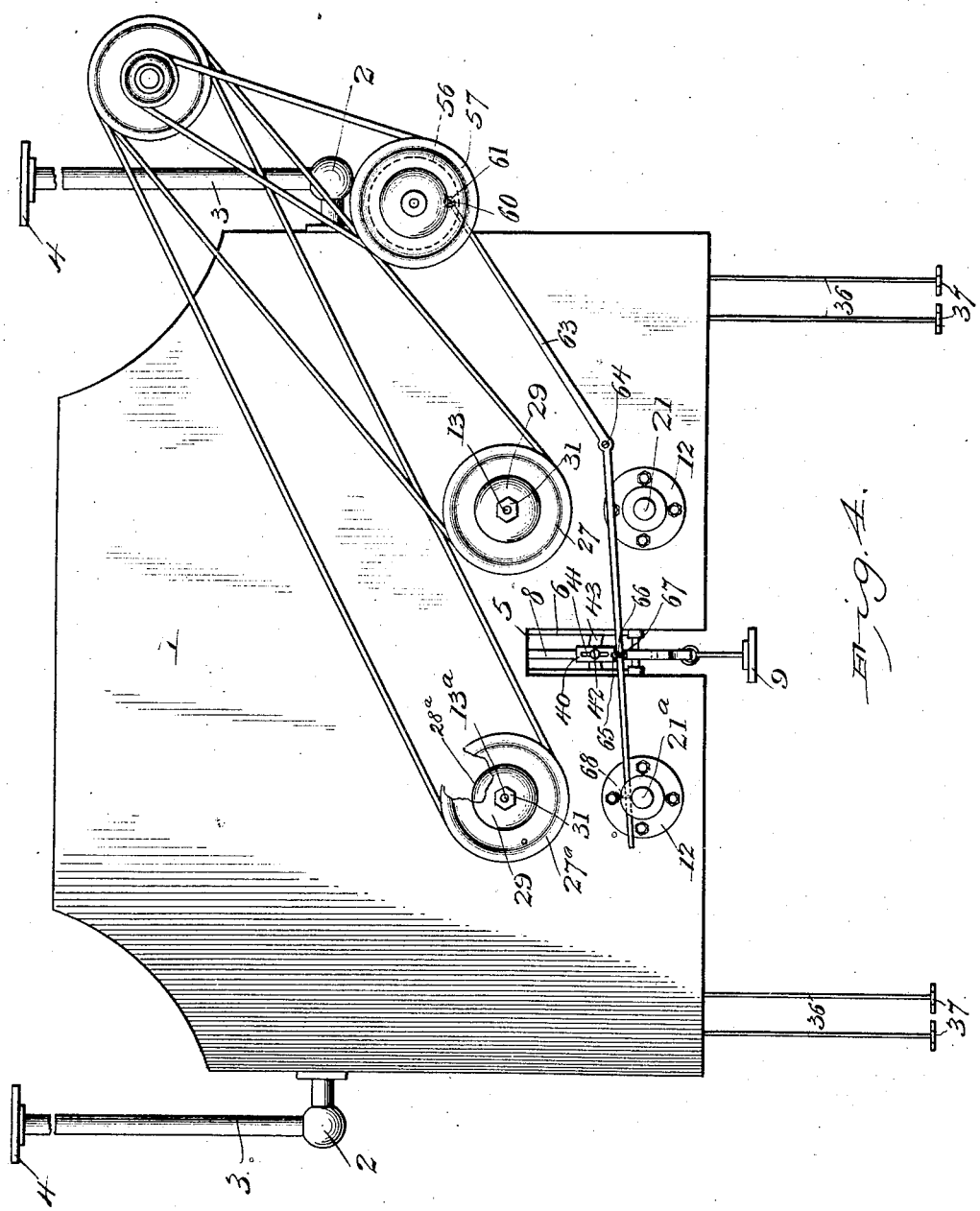
Figure 5:
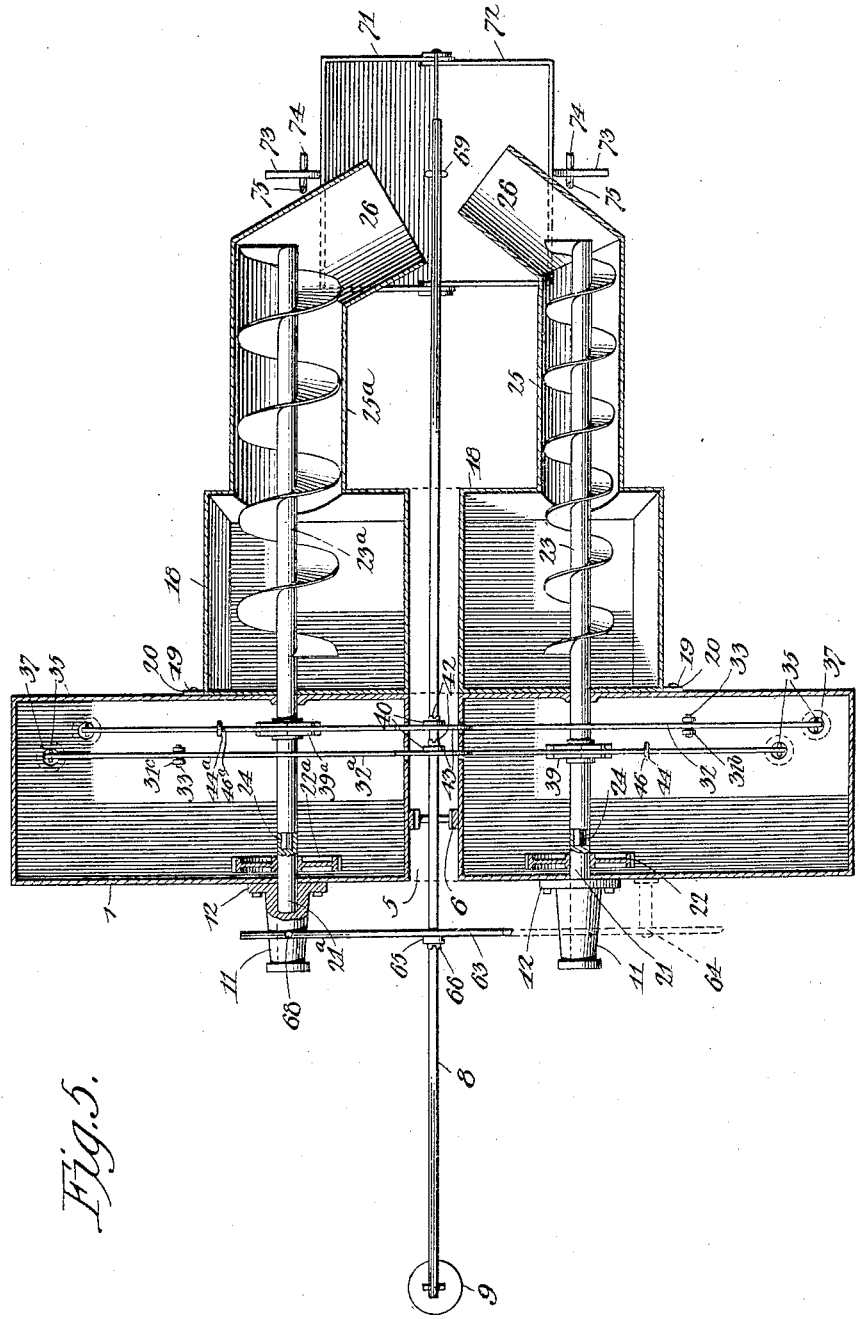

In the accompanying drawings, Figure 1 is a front view of an automatic weighing apparatus constructed in accordance with my invention. Fig. 2 is a front view of the same with the hopper and the entire front part of the casing broken away to expose the interior of construction. Fig. 3 is a sectional elevation. Fig. 4 is a rear view. Fig. 5 is a sectional plan view of the apparatus, taken on a line above the feed-screws. Fig. 6 is a perspective detail view of the trip-lever 63 and related parts. Fig. 7 is a perspective detail view illustrating a portion of one of the cross-beams and the means for preventing displacement of the same. Fig. 8 is a detail elevation illustrating a modification of the means for receiving the discharge from the weighing apparatus.

Corresponding parts in the several figures are indicated by like characters of reference.

1 designates a casing, the sides of which are provided with laterally-extending lugs 2, receiving the lower ends of supporting-arms 3, the upper ends of which have flanges 4 to receive screws or bolts, whereby the device may be supported from the ceiling of the room where it is to be used or from any other suitable supporting means. The lower end of the casing is bifurcated to form a recess 5, into which extends the lower end of a clevis 6, which is suitably supported at a point 7 within the casing. The clevis 6 forms the support for a scale-beam 8, which is pivotally mounted therein in the usual manner, so as to permit it to vibrate freely upon its fulcrum. The rear end of the scale-beam carries a counterpoise 9, which may be weighted to any desired extent.

To the rear side of the casing 1 are secured two pairs of tubular sleeves or bearings, the upper ones of which are designated 10, the lower ones 11. Said sleeves have flanges 12 to receive the screws or other fastening means whereby they are attached to the casing. The upper sleeves 10 form bearings or supports for shafts 13 13$^a$ upon the said shafts; but inside the casing are mounted gear-wheels 14 and 14$^a$, and the front ends of said shafts are provided with longitudinal bores or sockets 15 to receive the ends of stems 16, having radially-extending beaters or agitators 17. These agitator-stems extend forwardly into a hopper 18, which is mounted upon the front side of the casing 1 by means of screws 19, extending through lugs 20 upon the sides of said hopper or in any other suitable manner.

The lower sleeves 11 form bearings for shafts 21 and 21$^a$. These shafts are provided with pinions 22 and 22$^a$, meshing with the gear-wheels 14 and 14$^a$ upon the shafts above, from which they derive motion. The front ends of the shafts 21 and 21$^a$ are socketed to receive the spiral conveyer-shafts 23 and 23$^a$, the inner ends of which may engage the said sockets 24 frictionally or be secured thereto by any suitable means. The spiral conveyers 23 and 23$^a$ are of different sizes, the former being considerably smaller in diameter than the latter, and their ends are extended into spouts 25 and 25$^a$, suitably connected with the hopper and having converging discharge ends 26, through which the material fed by said spiral conveyers may be discharged to a receptacle arranged underneath. It is obvious that the said spiral conveyers being rotated at the same rate of speed will feed the material from the hopper 18 with unequal rapidity. This is important for reasons which will hereinafter be made more plainly apparent.

The shafts 13 and 13ª are provided with friction-pulleys 27 and 27ª, that bear against friction-collars 28 and 28ª upon the rear end of the tubular sleeves or bearings 10. Washers 29, loosely mounted upon the said shafts in front of the said friction-pulleys, are pressed against the latter by springs 30, the outer ends of which bear against nuts 31 upon the ends of the shafts, whereby the tension of said springs may be regulated, so that the pulleys 27 and 27ª when thus clamped between the friction collars and washers impart to the shafts 13 and 13ª the motion received by said pulleys by means of belts or bands from the source of power.

31ᵇ and 31ᶜ designate a pair of posts or uprights arranged within the casing and having bearings at their upper ends for the cross-beams 32 and 32ª, which are provided in the usual manner with transverse pivot-pins 33, engaging eyes 34 of said bearings. The cross-beams 32 and 32ª extend transversely through the casing, one in the front of the other, and are provided at their respective ends with clevises 35, supporting depending rods 36, the lower ends of which are provided with nuts 37, adapted to support weights. It will be observed that the weight-supporting rods 36 are connected with the cross-beams at both ends of the latter, thus enabling weights to be placed thereon for the purpose of either adding to or subtracting from the counterpoise upon the main scale-beam 8.

The cross-beams 32 and 32ª are provided with notches 38 and 38ª, adapted to engage ratchet-wheels 39 and 39ª, mounted upon the shafts 23 and 23ª, respectively. To hold the said notches of the cross-beams normally out of engagement with said ratchets, I provide each of said cross-beams with a vertically-adjustable slide 40, slotted at 41 to receive a set-screw 42, whereby connection with the arched central portions 43 of the said cross-beams may be made. The purpose of arching the central portions of the cross-beams is simply to enable them to clear the main scale-beam, as will be readily understood. When the front end of the main scale-beam is elevated by the counterpoise 9 at its rear end, it thus supports the notched cross-beams out of engagement with the ratchet-wheels 39 and 39ª, thus permitting the shafts upon which the latter are mounted to revolve freely in their bearings. When the ratchet-wheels engage the notches or stops in the cross-beams and the shafts 21 and 21ª are thus prevented from revolving, the friction-pulleys 27 and 27ª will revolve loosely upon their respective shafts, while the operation of the spiral conveyers and the agitators above the same will be temporarily suspended.

The casing 1 also contains a pair of posts or uprights 44 and 44ª, adapted to engage shouldered recesses 45 and 45ª in the under sides of the cross-beams. These devices perform an important function in that when the cross-beams are depressed so as to cause the notches therein to engage the ratchet-wheels 39 and 39ª the said shouldered recesses will at the same time come into engagement with the upper ends of the said posts or uprights, and thus the latter will receive the longitudinal strain exerted by the ratchet-wheels upon the said cross-beams and which in the absence thereof would be exerted upon the pivots of the cross-beams, which might thereby be injuriously affected. The posts or uprights 44 and 44ª are provided at their upper ends with loops 46 and 46ª, embracing the cross-beams in order to prevent lateral displacement of the latter.

Suitably secured upon the front side of the hopper 18 are a pair of brackets 47, having bearings for a shaft 48, extending transversely in front of the hopper. This shaft 48 carries an eccentric cam 49, arranged to bear against the upper side of the main scale-beam 8 near the front end of the latter. The shaft 48 carries at one end a bevel-gear 50, meshing with a bevel-gear 51, mounted upon a shaft 52, which is journaled in boxes or bearings 53, formed upon a supporting-piece 54, which may be suitably attached to the side of the casing. It is obvious that this supporting-piece may be of any desired size and shape; also, that, if preferred, it may be dispensed with and the bearings for the shaft 52 formed directly upon the side of the casing. To retain the shaft 48 securely in its bearings, it is provided with a collar 55, bearing against the side of one of the journal-boxes in which said shaft is mounted, the other end of said shaft being prevented from displacement by the miter-gearing 50 and 51.

The shaft 52 is provided near its rear end with a friction-disk 56, adapted to be engaged by a friction-pulley 57, which is held in contact therewith by the action of a spring 58, the pressure of which may be regulated by means of a nut 59 upon the rear end of the shaft. The friction-disk 56 is provided on its front side with a pin 60, upon which is journaled a roller 61.

63 designates a trip-lever which is fulcrumed at 64 upon the rear side of the casing, where it has a solid support. One end of this lever, which I shall describe as the "outer" end, is adapted to engage against the roller 61. The inner end of the said lever extends across the main scale-beam 8 and is provided with a slide 65, adjustable by means of a set-screw 66, extending through a vertical slot 67 in said slide. This slide, as will be seen, may be adjusted so as to engage or bear against the upper edge of the beam 8. The inner end of the trip-lever has a vertical adjusting-screw 68, adapted to rest upon the upper side of one of the tubular sleeves or bearings 11, thereby maintaining the said trip-lever in normal position, with its outer end engaging the roller 61.

The front end of the scale-beam 8 is provided with a clevis 69, supporting a bail 70, the ends of which are extended through opposite sides of a bucket 71, which is composed of two sides or sections 72-72, pivotally connected by the said bail in such a manner that the lower ends of said sections, which are normally held together by the weight of said sections, may be separated to discharge the contents of the buckets when the front end of the scale-beam is caused to descend. To provide for the opening of the bucket, I secure upon each side of the same a laterally-extending arm 73, adapted to engage projections or hooks 74 upon the lower ends of rods 75, secured to the sides of the brackets 47. It will be seen that when the scale-beam descends the arms 73 will strike against the hooks or projections 74 and that the sections 72 of the bucket will thus be forced to swing apart from each other, thus permitting the contents of the bucket to escape through the opening between the sections at the lower end thereof. It is self-evident that the sections constituting the bucket should be sufficiently weighted at their outer upper corners to make it impossible for them to swing apart under the impulse of the weight of the contents placed therein.

The hopper 18, the capacity of which is necessarily limited, receives through a spout 76 the discharge from another and larger hopper placed above and which in turn is connected with the source of supply. Suitably arranged in the vertical spout 76 is a shaft 77, having radial beaters or agitators 78 and provided with a loop or bail 79, engaging the flaring sides of the lower end of the upper hopper, (indicated at 80.) This auxiliary feeding device is to keep the hopper 18 constantly supplied with a sufficient quantity of the material which is to be weighed. Motion may be imparted to the agitator-shaft 77 in any suitable manner from the source of power.

In operation motion is imparted to the spiral conveyers which constitute the feeding mechanism of my improved weighing apparatus from the source of power by means of the friction-pulleys 27 and 27$^a$, which are to be connected by means of bails or bands with pulleys upon the counter-shaft from which the apparatus is driven. From the shafts 13 and 13$^a$, upon which the said friction-pulleys are mounted, motion is transmitted by means of the gear-wheels 14 and 14$^a$ and pinions 22 and 22$^a$ to the shafts 21 and 21$^a$, at the front ends of which the spiral conveyers 23 and 23$^a$ are mounted. The said conveyers being thus rotated in their respective spouts or bearings will convey the material from the hopper 18 to the receiving vessel arranged underneath the discharge ends of said spouts and which in this case has been illustrated as being the bucket 71. When a sufficient quantity of material has been delivered into the receiving vessel to tilt the scale-beam from which the said vessel is suspended, the said scale-beam will permit the cross-beams supported thereon in front of its fulcrum to descend. The adjusting-slides 40 upon the said cross-beams have previously been set in such a manner that the notch 38 of the cross-beam 32 shall be almost instantly thrown into engagement with the ratchet-wheel 39 upon the shaft 21, carrying at its front end the large spiral conveyer 23. The revolution of the shaft 21 being thus suddenly checked, the large conveyer will cease to feed. As the front end of the scale-beam descends farther the adjusting-slide 40 of the cross-beam 32$^a$ will follow it, and the notch 38$^a$ of the said cross-beam will thus come into engagement with the ratchet-wheel 39$^a$ upon the shaft 21$^a$, suddenly checking the revolution of the latter and of the small spiral conveyer connected therewith, thus entirely suspending the operation of the feeding mechanism. The tilting of the scale-beam, however, has had another consequence in that the portion of the same immediately in rear of its fulcrum has engaged the under side of the inner end of the trip-lever 63, throwing the outer end of the latter out of engagement with the roller 61 upon the pin 60 of disk 56, which latter has hitherto been prevented from rotating by reason of such engagement. Motion is now imparted to the shaft 52 through the medium of the friction-pulley 57 engaging the said disk 56 and is transmitted from said shaft through the miter-gearing 48 51 to the shaft 48. The latter being revolved the cam 49 thereon will engage the front end of the scale-beam 8 and suddenly depress the same, as well as the bucket suspended therefrom. The arms 73, extending from the sides of said bucket, will now engage the hooks or projections 74, thus causing the sides of said bucket to be separated and its contents to be discharged into a receptacle placed underneath. As the cam 49 continues its rotation with the shaft 48 the front end of the scale-beam, which has been lightened of its load, ascends with it and exerting pressure against the under sides of the slides 40 upon the cross-beams raises the latter, throwing the notches in said cross-beams out of engagement with the ratchet-wheels. The latter being thus released, and consequently releasing their respective shafts and through the intermediate gearing the shafts 13 and 13$^a$, carrying the friction-pulleys, the rotation of said shafts will recommence and the feed mechanism will be again operative until a recurrence of the operation is caused by the receiving vessel being sufficiently weighted to again tilt the scale-beam.

In some cases it may be found desirable to dispense with the bucket 71, and the contents of the hopper may then be discharged directly into boxes, cans, or other receiving vessels, which may be placed upon a pan suspended from the scale-beam or otherwise suitably arranged in any convenient manner to receive the discharge from the hopper 18 and to exert pressure upon the front end of the main scale-beam. This construction has been illustrated in the detail view Fig. 8 of the drawings, where 81 designates a pan suspended from the scale-beam, and 82 a receiving vessel placed thereon, said receiving vessel being represented as an ordinary cylindrical can, or the discharge from the hopper may be into the scoop or pan suspended from the scale-beam, as will be readily understood.

My improved automatic weighing-machine, as will be seen from the foregoing description, is by no means intricate or complicated, and the method of its construction is such as to insure great durability as well as certainty of operation under all circumstances. The weighing mechanism is extremely sensitive, and the work performed by the machine will consequently be very accurate. The arrangement of the separate and independent spiral conveyers of different sizes and in such a manner that the operation of the larger one shall be first suspended adds to the accuracy of the work performed by the machine, for the reason that the adjustment may be such that the operation of the large conveyer shall be suspended just before the desired amount of material has been conveyed into the receiving vessel. For a moment following the smaller conveyer will continue its operation, thus completing the desired weight without danger of much overweight being conveyed into the receiver, as would probably be the case if only a single conveyer were used. It is obvious that the main beam, as well as the cross-beams, may be weighted and the slides 40 upon the cross-beams adjusted in such a manner that the operation may be performed with the utmost nicety.

Having thus described my invention, I claim and desire to secure by Letters Patent of the United States—

1. In a weighing-machine, the combination of a scale-beam, weighted cross-beams supported thereon, and frictionally-operated feeding mechanism controlled by said cross-beams.

2. In a weighing-machine, the combination of a scale-beam, cross-beams supported thereon, frictionally-operated feeding mechanism, and ratchet means controlled by said cross-beams for checking the said frictionally-operated feeding mechanism, substantially as set forth.

3. In a weighing-machine, the combination of a scale-beam, cross-beams extending across the same, adjustable slides upon the cross-beams supported by the main scale-beam, feeding mechanism, and operating means for said feeding mechanism controlled by the said cross-beams, substantially as set forth.

4. In a weighing-machine, the combination of a scale-beam, cross-beams extending across the same, adjustable slides upon the cross-beams supported by the said main scale-beam, frictionally-operated feeding mechanism, and ratchet means controlled by said cross-beams for checking the said frictionally-operated feeding mechanism, substantially as set forth.

5. In a weighing-machine having frictionally-operated feeding mechanism including a feed-shaft and a ratchet mounted thereon, a pivotally-mounted controlling-beam having a notch adapted to engage said ratchet, said controlling-beam being provided with a shouldered recess, and a fixed support adapted to engage said shouldered recess.

6. In a weighing-machine, having frictionally-operated feeding mechanism, the combination of a scale-beam, a cross-beam extending across and supported thereon, ratchet means connected with the feeding mechanism and adapted to engage a notch in the cross-beam when the latter descends, a shouldered recess in the under side of said cross-beam, and a fixed support adapted to engage said recess, substantially as set forth.

7. In a weighing-machine having frictionally-operated feeding mechanism including spiral conveyers, the rotary agitators arranged above said conveyers and connected by positive gearing with the shafts of said conveyers, substantially as set forth.

8. In a weighing-machine, the combination with spiral conveyers of unequal size, and a receiving vessel suspended from the scale-beam and arranged to receive the discharge from said conveyers, of friction mechanism for operating said conveyers, ratchets upon the conveyer-shafts, pivotally-mounted cross-beams extending across the main scale-beam and having notches adapted to engage the ratchets upon the conveyer-shafts, and adjusting-slides upon the said cross-beams whereby the descent of the latter to engage the ratchets may be regulated with relation to the descent of the main beam, substantially as set forth.

9. In a weighing-machine, the combination of frictionally-operated agitators, spiral conveyers arranged below, and geared to, said agitators, ratchets connected with the shafts of the spiral conveyers, a main scale-beam, pivotally-mounted controlling-beams extending across and supported upon the latter, notches in said controlling-beams adapted to engage the ratchets upon the conveyer-shafts, and weight-supporting rods depending from said controlling-beams at both ends of the same, substantially as set forth.

10. In a weighing-machine, the combination of frictionally-operated agitators, spiral conveyers geared to said agitators, ratchets connected with the shafts of the spiral conveyers, a main scale-beam, pivotally-mounted controlling-beams having notches engaging the ratchets, adjustable slides supported upon the main scale-beam, and weight-supporting rods depending from said controlling-beams on opposite sides of the fulcrums of said controlling-beams, substantially as set forth.

11. In a weighing-machine, the combination of frictionally-operated ratchets, pivotally-mounted controlling-beams having notches adapted to engage said frictionally-operated ratchets, and provided with shouldered recesses, and fixed supports adapted to engage said shouldered recesses, substantially as set forth.

12. In a weighing-machine, the combination with a scale-beam supporting a receiving vessel, of a normally inactive eccentric cam adapted to engage and depress the said scale-beam at the end thereof which supports said receiving vessel, friction means for actuating said eccentric cam intermittently, at times when the scale-beam is beginning to be tilted by the weight of the contents accumulating in the receiving vessel, and means for checking the rotation of the cam driving-shaft, substantially as set forth.

13. In a weighing-machine, the combination of a scale-beam, a receiving vessel supported thereby, an eccentric cam adapted to engage the end of a scale-beam which supports said receiving vessel, friction means for operating said eccentric cam, and a trip-lever extended at one end across the scale-beam and adapted to be tripped thereby and adapted to engage at its opposite end a detent of the friction mechanism whereby the eccentric cam is operated, substantially as set forth.

14. In a weighing-machine, the combination of a main scale-beam, a receiving vessel supported at one end of the same, a counterpoise at the opposite end thereof, an eccentric cam arranged above and adapted to depress the end of the scale-beam supporting the receiving vessel, friction means including a friction-disk for operating said cam, a roller mounted eccentrically upon the disk of said friction means, a trip-lever engaging at one end the said roller and preventing the rotation of the disk with which it is connected, an adjustable slide mounted upon said trip-lever on the opposite side of its fulcrum, and engaging the scale-beam, and an adjusting-screw in the said trip-lever engaging a fixed support, substantially as set forth.

15. In a weighing-machine, the combination of a scale-beam, feeding mechanism, friction means for intermittently operating the latter, an eccentric cam mounted above the scale-beam, friction means for intermittently operating said eccentric cam, and intermediate mechanism whereby the tilting of the scale-beam shall operate to suspend the operation of the feeding mechanism and to throw the cam-actuating mechanism into operation.

16. In a weighing-machine, the combination of a scale-beam, feeding mechanism, friction means for intermittently operating the latter, an eccentric cam mounted above the scale-beam, friction means for intermittently operating said eccentric cam to tilt the scale-beam, a receiving vessel supported upon the latter, means for automatically discharging the contents of said receiving vessel when the scale-beam is tilted, and intermediate mechanism whereby the tilting of the scale-beam shall operate to suspend the operation of the feeding mechanism and to throw the cam actuating mechanism into operation.

17. In a weighing-machine, the combination of a bifurcated casing, a main scale-beam disposed in the recess in the bottom of said casing, feeding mechanisms located in the lower ends of said casing adjacent to said recess, and cross-beams pivotally mounted within the casing and extending across and supported upon the main scale-beam, said cross-piece operating to control the feeding mechanisms, substantially as set forth.

18. In a weighing-machine of the class described, the herein-described bifurcated casing in combination with the main scale-beam located in the central recess of said casing, operating means and feeding mechanisms disposed within the casing and a hopper upon the front side of the latter, substantially as set forth.

In testimony that I claim the foregoing as my own I have hereto affixed my signature in the presence of two witnesses.

ALEXANDER HASTINGS CANNING.

Witnesses:
   THOMAS ALEXANDER GIBSON,
   RUSSELL BARR KINNEAR.